UNITED STATES PATENT OFFICE.

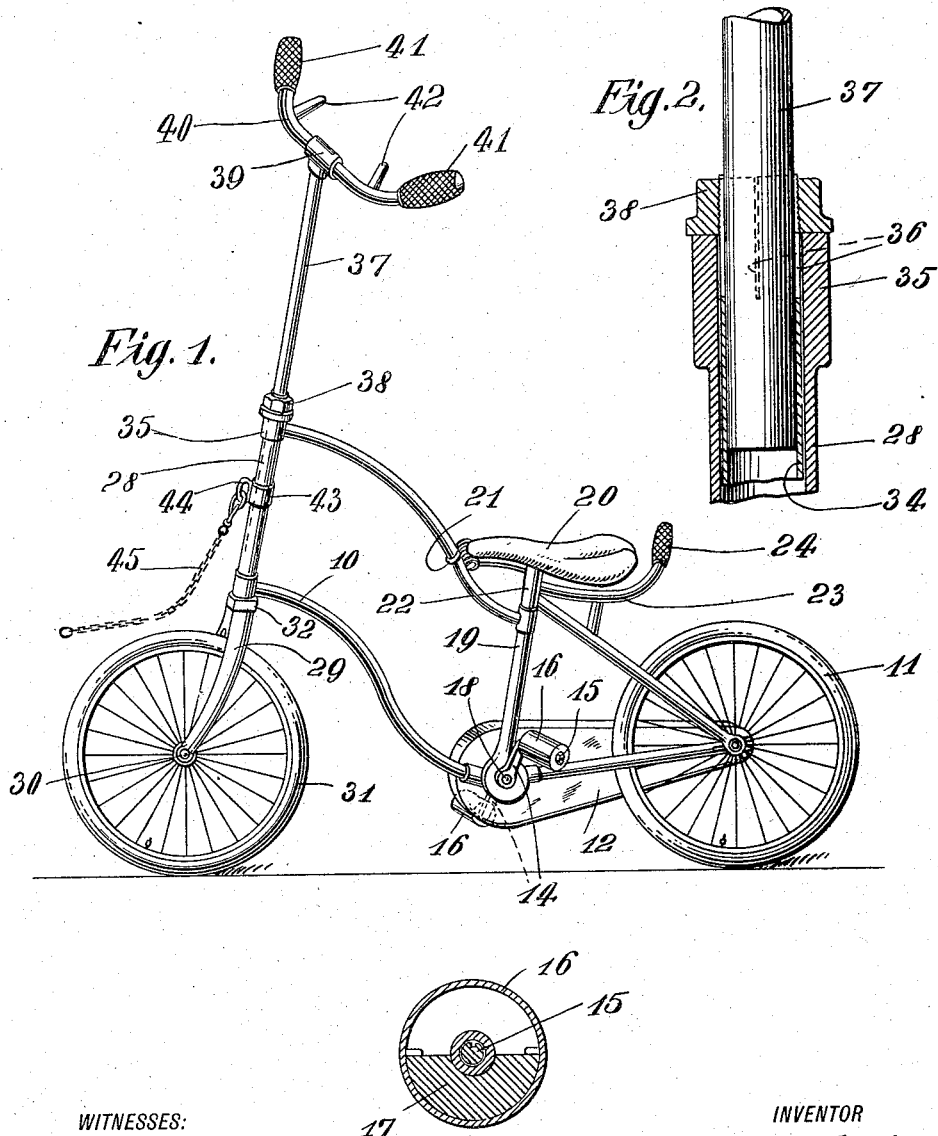

EMIL PALLENBERG, OF BRIDGEPORT, CONNECTICUT.

VELOCIPEDE FOR ANIMAL ACROBATS.

1,200,970. Specification of Letters Patent. Patented Oct. 10, 1916.

Application filed November 1, 1915. Serial No. 59,016.

*To all whom it may concern:*

Be it known that I, EMIL PALLENBERG, a subject of the Emperor of Germany, residing at Bridgeport, in the county of Fairfield and State of Connecticut, have invented new and useful Improvements in Velocipedes for Animal Acrobats, of which the following is a specification.

This invention relates to improvements in acrobatic apparatus and in particular to wheeled types, of the bicycle order, adapted to exhibit trained animals with special reference to bears which are taught to ride and control the same.

The objects of the invention are, to provide a vehicle capable of being adjusted to suit the animal riding it; to provide a manual control means operable by an attendant, and in general, to provide a novel construction of unusual strength specially adapted to its peculiar purpose.

These objects are attained by the novel combination and adaptation of parts hereafter described and shown in the accompanying drawing, forming a part of this specification, and in which:—

Figure 1 is a perspective view of an apparatus made in accordance with the invention. Fig. 2 is an enlarged vertical sectional view of the handle bar stem adjusting means, and Fig. 3 is cross sectional view taken through the pedals.

Referring to Fig. 1 of the drawing, a frame 10, is shown, supported by wheels, of which the rear or driving wheel 11 is actuated by sprockets and a chain housed within the casing 12, operated by pedal cranks 14 as usual. Mounted on the stems 15, extending laterally out from the cranks are rollers 16, which may be round, square, or polygonal as desired, each containing a weight, as 17, whereby they are held normally against rotation upon the stems 15.

Rising from the crank shaft 18 is the hollow frame or seat post member 19 on which is mounted a seat 20 secured, as at 21, to the upper member of the frame 10.

To the seat support 22 is secured a rearwardly extending lever 23, furnished with handles 24 adapted to be grasped by an operator in maneuvering the apparatus. At the front of the frame is the usual vertical hollow bar 28, within the lower end of which are secured the forks 29 engaging the front axle 30, and between which is secured the front wheel 31, the weight of the frame and rider being taken on the fork crown 32. Within the member 28 is a tube 34, engaging the fork in such manner as to transmit rotary motion to it, the tube being split at its upper end where it passes through the enlargement 35, the slits 36 in the tube allowing it to be clamped upon the bar 37 by means of the clamp nut 38, so that the bar 37 and the tube 34 may be rigidly locked together when adjusted to the height desired. At the upper end of the bar 38, in the T 39, is secured a handle bar 40 terminating in the handles 41 and further provided with short, rearwardly extending stems 42 to prevent slipping of the animal's paws as they rest upon the handles. Also on the post 28 is a collar 43, in the eye 44, of which is secured the chain 45 which may be fastened to a collar upon the neck of the animal.

From the foregoing, it will be seen that the apparatus is capable of being propelled by an animal, whose weight is largely taken on the seat, and by reason of the short crank action, the apparatus is easy to operate. Also that as the pedal rollers do not freely revolve, that the danger of the feet slipping from the pedals is largely overcome, while the stems 42 assist in maintaining the front paws or feet of the animal in position on the handle bars.

In order to provide against inadvertent mishaps, as in teaching the animal to ride, the handles 24 are arranged to be grasped by an operator, in charge of the animal, who is thus able to maintain the apparatus in a vertical condition, and control its movements.

Having thus described my invention, what I claim as new and desire to obtain by Letters Patent is:—

1. In a device of the class described, the combination with a frame, having a driving wheel at the rear, a dirigible wheel at the front, and means for steering said front wheel, of a pair of oppositely disposed pedals mounted upon their cranks consisting of rollers having weights disposed below the center thereof, and operative connections between said pedals and said driving wheel.

2. In a device of the class described, the combination with a frame having a driving wheel at the rear, and a dirigible wheel at the front, of a vertically adjustable handle bar operatively engaged with said front wheel, a pair of pedals having weighted rollers, operative connections between said pedals and said rear wheel, a seat post having a seat therein, and means for manually controlling the operation of said frame, said means being attached to said seat post.

In testimony whereof I have signed my name to this specification.

EMIL PALLENBERG.

Copies of this patent may be obtained for five cents each, by addressing the "Commissioner of Patents, Washington, D. C."